(12) United States Patent
Anthony et al.

(10) Patent No.: US 11,743,554 B2
(45) Date of Patent: Aug. 29, 2023

(54) CONTENT STREAMING AND PRODUCT INTEGRATION

(71) Applicant: NCR Corporation, Atlanta, GA (US)

(72) Inventors: Julie Anthony, Mumbai (IN); Simridh Kachroo, Gurugram (IN); Pratik Basavraj Parshetti, Kolhapur (IN); Chetan Kamalakar Shet, Maharashtra (IN)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 17/551,573

(22) Filed: Dec. 15, 2021

(65) Prior Publication Data

US 2023/0188807 A1    Jun. 15, 2023

(51) Int. Cl.
*H04N 21/81* (2011.01)
*G06Q 30/0601* (2023.01)
*H04N 21/478* (2011.01)
*H04N 21/45* (2011.01)

(52) U.S. Cl.
CPC ....... *H04N 21/812* (2013.01); *G06Q 30/0633* (2013.01); *H04N 21/4532* (2013.01); *H04N 21/47815* (2013.01)

(58) Field of Classification Search
CPC ............. H04N 21/812; H04N 21/0633; H04N 21/4532; H04N 21/47815
See application file for complete search history.

(56) References Cited

U.S. PATENT DOCUMENTS

| | | | | |
|---|---|---|---|---|
| 11,049,176 | B1 * | 6/2021 | Drynan | G06Q 20/3276 |
| 2014/0100993 | A1 * | 4/2014 | Farmer | G06Q 30/0251 |
| | | | | 705/27.1 |
| 2014/0129337 | A1 * | 5/2014 | Otremba | G06Q 30/0261 |
| | | | | 705/14.58 |
| 2016/0007083 | A1 * | 1/2016 | Gurha | H04N 21/25808 |
| | | | | 725/13 |

* cited by examiner

*Primary Examiner* — Chenea Davis
(74) *Attorney, Agent, or Firm* — Schwegman Lundberg & Woessner, P.A.

(57) ABSTRACT

During steaming of media selection to a user device, products are identified within scenes of the selection for selection by a user. A selected product returns a Unique Identification Number (UIN). Retailers offering the selected product are identified and prices offered for the product obtained based on the UIN. A sorted list of the retailers and prices are returned to the user during media selection play on the user device. A selected retailer by the user made during media selection play on the user device initiates a transaction with that retailer for purchase of the product by the user. In an embodiment, audit data for selected products and purchased products are maintained; metrics generated for the audit data, and specific targeted products by user or by media selection are identified for highlighting during media selection playing by the users.

15 Claims, 3 Drawing Sheets

CONTENT STREAMING AND PRODUCT INTEGRATION

BACKGROUND

Over-The-Top (OTT) media service is becoming increasingly popular with consumers. OTT media services allows video on demand streaming to consumers without using traditional television broadcasts or telecommunication broadcasts. Basically, anyone with an Internet connection can stream content on demand to a device of a consumer's choosing, at a location desired by the consumer, and a time convenient to the consumer.

OTT streaming bypasses over-the-air television broadcasts, cable fiber networks, and phone networks. Some OTT media services also permit some live programming offered by television networks as streaming over the Internet.

Most OTT media services offer on-demand content streaming via web-based interfaces from browsers or via applications from mobile devices, game consoles, smart televisions, and digital media players. As traditional cable memberships decline, OTT media subscriptions are growing exponentially in the industry. The phrase used in the industry for consumer moving from traditional content providers to OTT content provides is referred to as "cord cutters." In fact, because cord cutting has been so popular, most if not all of the traditional broadcasters now have their own OTT media offerings.

Oftentimes a consumer enjoying content (either through traditional broadcasts channels or through OTT streaming), identifies something in a scene that catches their eye. In these situations, the consumer is motivated and engaged and is of high-value to potential retailers. However, the current models of passively watching content do not allow the consumer to express their interest in something presented in the scene and retailers are completely unable to reach out to the consumer, such that the moment in time where a retailer may have made a sale to a potential customer goes unnoticed and disappears shortly have the content the consumer is watching switches to a next scene.

SUMMARY

In various embodiments, a system and methods for content streaming and product integration are presented.

According to an embodiment, a method for product integration into content streams is provided. A product identifier for a product is received from a media streaming service selected by a user during streaming of media selection on a user device. Retailers are identified that offer the product based on the product identifier and a price is obtained for the product from each of the retailers. A list is generated that comprises retailer identifiers for the retailers and the corresponding prices for the retailers. The list is provided back to the media streaming service for presentation to the user during streaming of the media selection on the user device.

DETAILED DESCRIPTION

Figure 1:
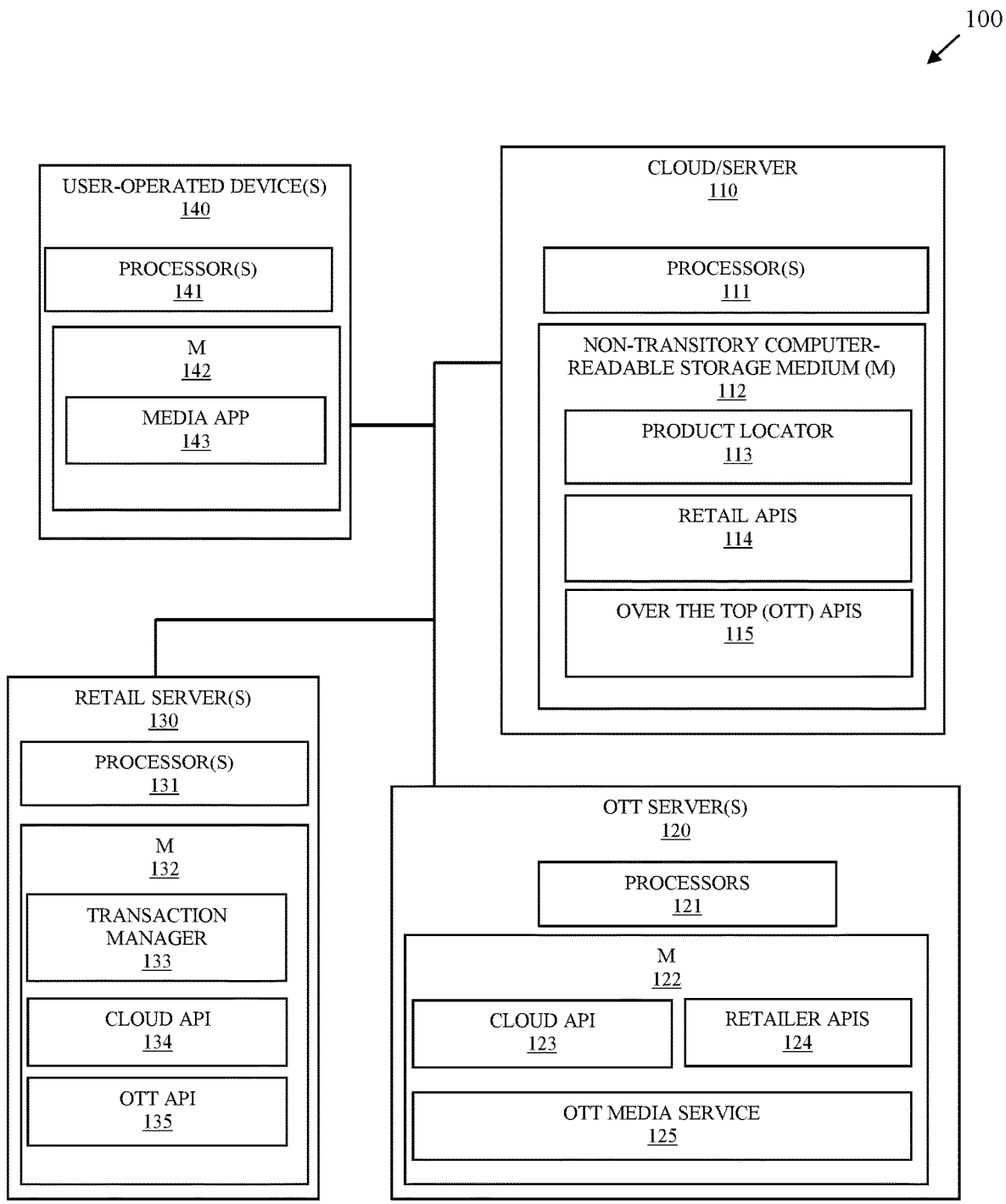
FIG. 1 is a diagram of a system for content streaming and product integration, according to an example embodiment.

FIG. 1 is a diagram of a system/platform 100 for content streaming and product integration, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of content streaming and product integration, presented herein and below.

System 100 provides a platform/processing environment by which a consumer's viewing of content becomes an interactive session that allows products related to scenes of the content to be investigated by the consumer within the content streaming application (app), retailers identified for the products on behalf of the content provider, product information for the products presented to the consumers within the content streaming app, and transactions between the consumer and a consumer-selected retailer processed through the content provider from the content streaming app. Retailers (who provide a content-scene product of a media selection being watched by a consumer within the content streaming app) are dynamically identified and pricing information for the product obtained from the retailers. A list of retailers offering the product is returned to the content provider and presented within the content streaming app to the consumer, when a consumer selects a given retailer for a purchase of the product, the content provider utilizes a corresponding retailer Application Programming Interface (API) to link the consumer to the retailer's online store and purchase the product from the content streaming application of the content provider.

A variety of embodiments and configurations of system 100 are now discussed with reference to FIG. 1.

The terms "user," "consumer," and/or "customer" may be used interchangeably and synonymously herein and below. This refers to an individual who watches a media selection via a user-operated device being streamed by an OTT content provider and the user expresses an interest in a product displayed in at least one scene of the media selection via a user-facing interface of a media streaming application of the content provider.

Cloud/server 110 comprises at least one processor 111 and a non-transitory computer-readable storage medium 112. Medium 112 comprises executable instructions for a product locator 113, retail APIs 114, and OTT APIs 115. The executable instructions when provided to processor 111 from medium 112 cause the processor 111 to perform operations discussed herein and below with respect to 113-115.

Each OTT server 120 comprises at least one processor 121 and a non-transitory computer-readable storage medium 122. Medium 122 comprises executable instructions a cloud API 123, retailer APIs 124, and an OTT media service 124. The executable instructions when provided to processor 121 from medium 122 cause processor 121 to perform operations discussed herein and below with respect to 123-125.

Each retail server 130 comprises at least one processor 131 and a non-transitory computer-readable storage medium 132. Medium 132 comprises executable instructions for a transaction manager 133, a cloud API 134, and an OTT API 135. The executable instructions when provided to processor 131 from medium 132 cause processor 131 to perform operations discussed herein and below with respect to 133-135.

Each user-operated device 140 comprises at least one processor 141 and a non-transitory computer-readable storage medium 142. Medium 142 comprises executable instructions for a media streaming app 143. The executable instructions when provided to processor 141 from medium 142 cause processor 141 to perform operations discussed herein and below with respect to 143.

OTT media service 125 is an existing media service enhanced with the processing discussed herein and below. Moreover, media app 143 is an existing media app enhanced with the processing discussed herein and below.

OTT media service 125 indexes media selections with Unique Identification Numbers (UIN) for products that appear in scenes of the media selections. This permits a user-facing interface associated with media app 143 to be enhanced to present tags integrated within scenes of a given media selection with product names associated with the UINs for the products and/or permits the user-facing interface to be enhanced to present in a portion of a user's viewing screen (a side, top, bottom, etc.) product names for products when a user is watching a given media selection through media app 143. The product names may be represented as selectable links from within the scenes or within a portion of the user's viewing screen.

When a product name is selected from the user-facing interface of media app 143 by a user while watching a media selection on device 140, the underlying UIN associated with the selected product name is provided to OTT media service 125. Other information is also known or returned with the UIN, such as device identifier for device 140, user account identifier for the user, media selection identifier for the media selection, current location when the UIN was selected by the user within the media selection, current date, and current time of day.

OTT media service 125 uses cloud API 123 and sends the selected UIN to product locator 113. Product locator 113 uses the UIN to identify retailers that offer the product (this may be through a mapping maintained by cloud/server 1120 for UINs and retailer identifiers for retailers). Product locator 113 uses the retail APIs 114 that correspond to the retailers that offer the product to request pricing and item details from the corresponding retailer through those retailers' cloud API 134. Each retailer server 130 returns a product available indication (can be current product inventory), a product price for the product, and, optionally, any offer associated with purchasing the product back to product locator 113 using cloud API 134 interacting with the corresponding retail API 114 of cloud/server 110.

Product locator 113 can then sort the retailers offering the product associated with the selected UIN based on price and return a list of retailer identifiers and prices for the product from lowest price to highest price back to cloud API 123 using OTT API 135 associated with the OTT server 120 that provided the UIN for the product.

OTT media service 125 presents the list of retailers by retailer names and the corresponding offered price by each retailer within the user-facing interface of media app 143 for selection of a specific retailer by the user. The list may be displayed in a portion of the user-interface screen being presented to the user during the media selection's play on device 140. Each presented retailer name or corresponding product price is selectable by the user through the user-facing interface of media app 143. When the user selects a given price or retailer, the retailer identifier for that retailer is identified by OTT media service 125. OTT media service 125 selects the corresponding retailer API 124 to communicate a transaction request for a transaction to the corresponding OTT API 135 of the retailer's server 130. The transaction request may also include user information retained in a subscriber profile for the user by OTT media service, such as user's home address, user's name, user's preferred delivery instructions, etc. The OTT API 135 provides the transaction request to transaction manager 133 to initiate a transaction for the user to purchase the product associated with the selected UIN OTT media service 125 interacts with transaction manager 133 through retailer API 124 and OTT API 135 while also interacting with the user-facing interface of media app 143 to place an order and purchase the product on behalf of the user while the user is watching a media selection of content being streamed by OTT media service 125 through media app 143 on the user's device 140.

In an embodiment, OTT media service 125 maintains registered payment information in a subscriber account for the user and can automatically place the order on behalf of the user by providing the payment information to transaction manager 133. Any electronic receipt for the transaction can be sent directly to the user by transaction manager 133 through contact information provided OTT media service 125 to transaction manager 133.

In an embodiment, OTT media service 125 provides a "buy-it-now" option next to the price for a given retailer presented within the user-facing interface of media app 143. When the user selects the buy it now, OTT media service sends the user delivery details, payment information, and contact information to transaction manager 133 using subscriber account information retained by OTT media service 125 for the user/subscriber.

In an embodiment, media app 143 reports the current geographical location of device 140 back to OTT media service 125. When a user selects a product from a scene of a media selection, OTT media service 125 provides the current geographical location of device 140 with the UIN for the product locator 113. Product locator 113 filters out the available retailers based on the geographic distance between device 140 and stores of the retailer that sell the product. The filtered list may be sorted by both price and distance between device 140 and each of the retail stores. OTT media service 125 receives the filtered and doubly sorted list and presented to the user within the user-facing interface of media app 143. The distances to the stores may also appear along side the retailer store names, and product prices for selection by the user.

In an embodiment, the user-facing interface of media app 143 permits a user to identify a pick-up for the product at a designated retail store or a delivery to a registered home address of the user (the registered home address can be changed to a different delivery address by the user through the user-facing interface).

In an embodiment, OTT media service 125 maintains product delivery options with the subscriber account of the user, which are selected by and defined by the user. The delivery options are applied by OTT media service 125 during a transaction for a product with a corresponding transaction manager 133.

In an embodiment, any purchased product causes OTT media service 125 to send audit data back to product locator 113 using cloud API 123 and OTT API 115. The metrics include the media selection identifier, the UIN for the product, the selected retailer identifier, the price offered, date of transaction, and time of day of transaction. Product locator 113 also obtains an OTT provider identifier for the OTT server 120 and stores the audit data for subsequent metrics generation and data mining. Each time product locator 113 receives a UIN from a given OTT media service 125 information regarding the product request is stored in the audit data along with the OTT provider identifier, user device identifier 140, media selection identifier, and current date and time of day. The audit data can be analyzed to determine targeted products that the OTT media service 125 should index and tag within media selection for a given customer or a given set of customers. Products can be identified by media selection and/or by customer/user based on analysis of the audit data.

In an embodiment, retailers subscribe with cloud/server 110 for proposing products to users from media selections of a given OTT. The sorted list of retailers returned with a given UIN can factor or weight these subscribed retailers higher in the list or make them more visible to the user for selection. These retailers may then obtain metrics illustrating how frequently they are selected for product purchases and not selected for product purchases over a given period of time. Additionally, subscribing retailers may pay a commission per product purchased back to cloud/server 110 and/or a given OTT server 120 based on subscription agreements.

In an embodiment, after an order is placed, an authentication process is processed to verify the user. The authentication can be handled by the OTT media service 125 for a subscriber account of the user and/or handled through transaction manager 133 utilizing retailer APIs 124. This prevents accidental order by children or others. The user authentication can be added to the workflows discussed above at a variety of points, such as when a product list is requested, when a product is ordered, when order details are provided, etc.

In an embodiment, user-operated device may be a laptop, a desktop, a phone, a watch, a smart television, a gaming console, or any other digital media device.

In an embodiment, 113-115 may be subsumed within and processed from a given OTT server 120.

The above-referenced embodiments and other embodiments are now discussed with reference to FIGS. 2 and 3.

Figure 2:
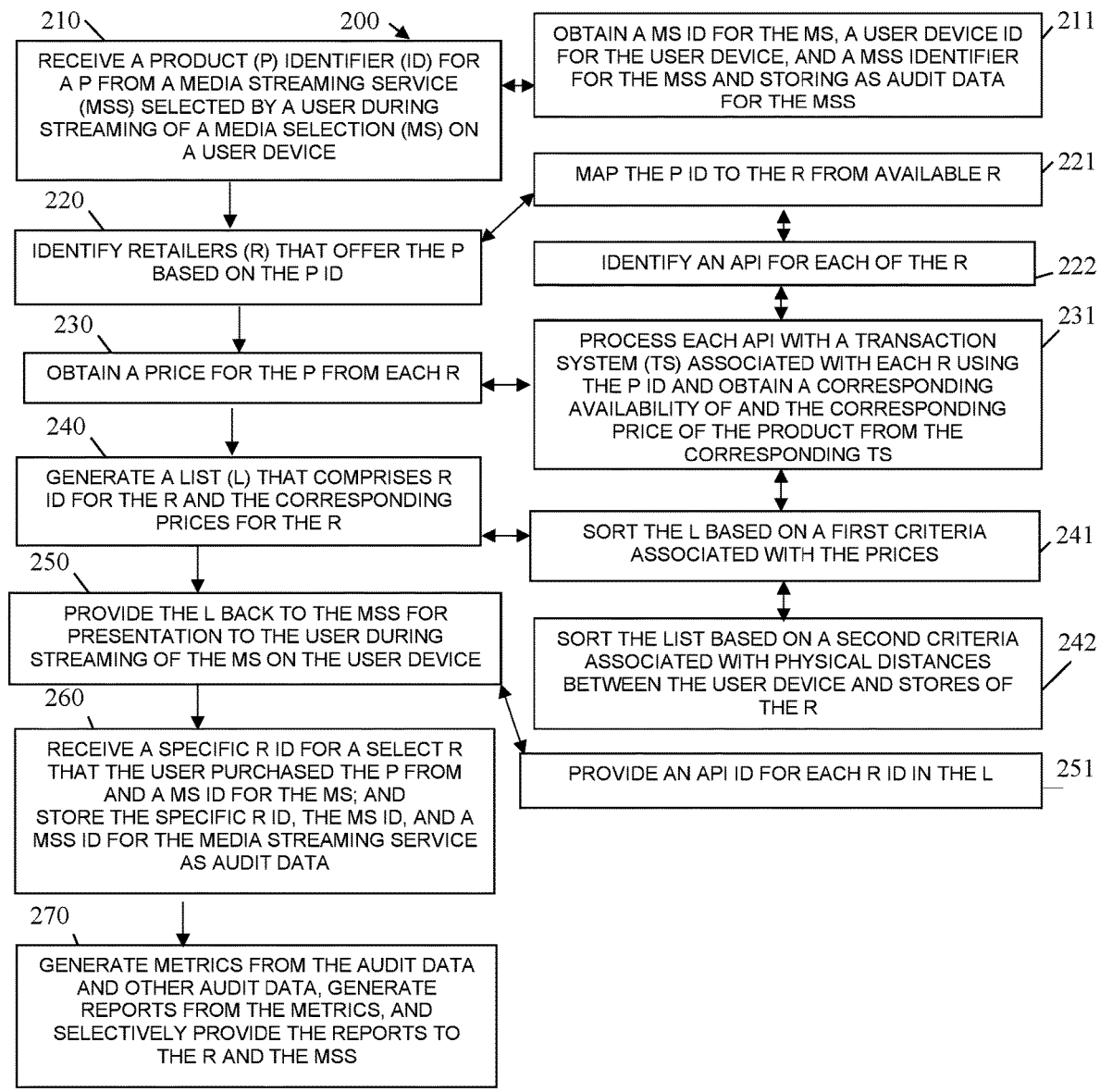
FIG. 2 is a diagram of a method for product integration into content streams, according to an example embodiment.

FIG. 2 is a diagram of a method 200 for product integration into content streams, according to an example embodiment. The software module(s) that implements the method 200 is referred to as a "streaming media and product integration service." The streaming media and product integration service is implemented as executable instructions programmed and residing within memory and/or a non-transitory computer-readable (processor-readable) storage medium and executed by one or more processors of one or more devices. The processor(s) of the device(s) that executes the streaming media and product integration service are specifically configured and programmed to process the streaming media and product integration service. The streaming media and product integration service may have access to one or more network connections during its processing. The network connections can be wired, wireless, or a combination of wired and wireless.

In an embodiment, the device that executes the streaming media and product integration service is cloud 110 or cloud processing environment 110. In an embodiment, the device that executes the streaming media and product integration service is server 110.

In an embodiment, the device that executes the streaming media and product integration service is an OTT server 120.

In an embodiment, the streaming media and product integration service is all or some combination of 113, 114, and/or 115.

At 210, the streaming media and product integration service receives a product identifier (UIN) for a product from a media streaming service 125 selected by a user during streaming of a media selection to a user device 140.

In an embodiment, at 211, the streaming media and product integration service obtains a media selection identifier for the media selection, a user device identifier for the user device 140, and a media streaming service identifier for the media streaming service 125 and storing as audit data for the media streaming service 125.

At 220, the streaming media and product integration service identifies retailers that offer the product based on the product identifier (UIN).

In an embodiment, at 221, the streaming media and product integration service maps the product identifier (UIN) to the retailer from available retailers based on the product identifier.

In an embodiment of 221 and at 222, the streaming media and product integration service identifies an API 114 for each retailer.

At 230, the streaming media and product integration service obtains a price for the product offered by each of the retailers.

In an embodiment of 222 and 230, at 231, the streaming media and product integration service processes each API 114 with a transaction system (transaction manager 133) associated with each retailer using the product identifier and the streaming media and product integration service obtains a corresponding availability (such as available product inventory count) and the corresponding price of the product offered from the corresponding transaction system 133.

At 240, the streaming media and product integration service generates a list that comprises the retailer identifiers and the corresponding prices for the retailers.

In an embodiment of 231 and 240, at 241, the streaming media and product integration service sorts the list based on a first criteria associated with the prices (such as sorting the list from lowest to highest price).

In an embodiment of 241 and at 242, the streaming media and product integration service further sorts the list based on a second criteria associated with the physical distances between a current location of the user device 140 and known store locations for stores of the retailers.

At 250, the streaming media and product integration service provides the list back to the media streaming service 125 for presentation to the user during streaming of the media selection on the user device 140.

In an embodiment, at 251, the streaming media and product integration service provides an API identifier for an API 124 associated with each retailer in the list.

In an embodiment, at 260, the streaming media and product integration service receives a specific retailer identifier for a selected retailer that the user purchased the produce from and a media selection identifier for the media selection from the media streaming service 125. The streaming media and product integration service stores the specific retailer identifier, the media selection identifier, and a media streaming service identifier for the media streaming service 125 as audit data.

In an embodiment of 260 and at 270, the streaming media and product integration service generates metrics from the audit data and other audit data, generates reports from the metrics, and selective provides the reports to the retailers and the media streaming service 125.

Figure 3:
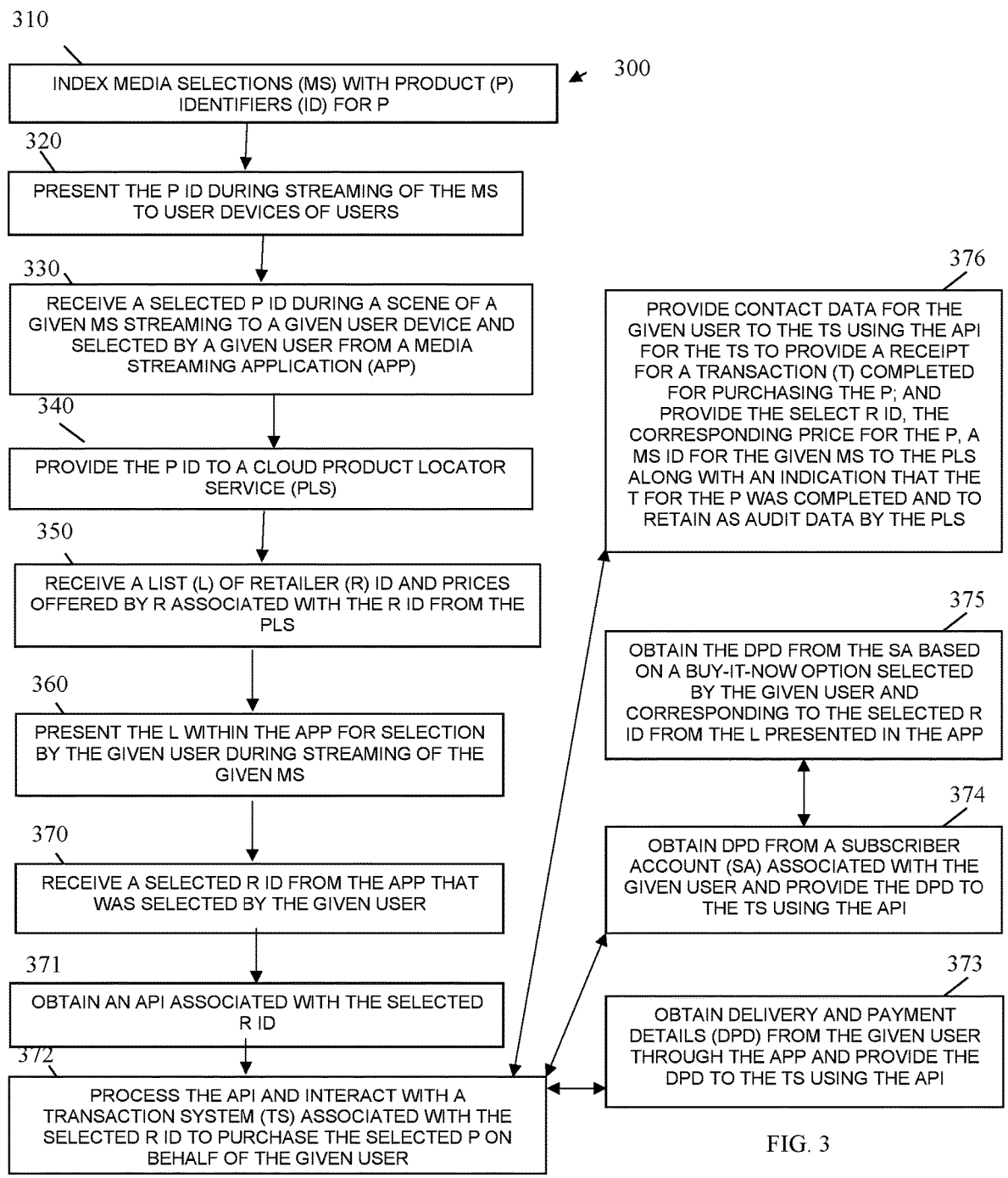
FIG. 3 is a diagram of another method for product integration into content streams, according to an example embodiment.

FIG. 3 is a diagram of another method 300 for product integration into content streams, according to an example embodiment. The software module(s) that implements the method 300 is referred to as an "OTT media service and product integration manager." The OTT media service and product integration manager is implemented as executable instructions programmed and residing within memory and/or a non-transitory computer-readable (processor-readable) storage medium and executed by one or more processors of a device. The processors that execute the OTT media service and product integration manager are specifically configured and programmed for processing the OTT media service and product integration manager. The OTT media service and product integration manager may have access to one or more network connections during its processing. The network connections can be wired, wireless, or a combination of wired and wireless.

In an embodiment, the device that executes the OTT media service and product integration manager is OTT server 120.

In an embodiment, the OTT media service and product integration manager is some combination or all of 123, 124, and/or 125.

The OTT media service and product integration manager interacts with cloud/server 110 and product locator 113 and interacts with multiple retailer servers 130 and OTT APIs 135.

At 310, the OTT media service and product integration manager indexes media selections and scenes of media selections with product identifiers (UINs) for products.

At 320, the OTT media service and product integration manager presents the product identifiers (names or labels for the UINs) during streaming of the media selections to user devices 140 of users.

At 330, the OTT media service and product integration manager receives a selected product identifier during a scene of a given media selection streaming to a given user device 140 and selected by a given user from a media streaming application 143.

At 340, the OTT media service and product integration manager provides the selected product identifier to a cloud product locator service 113.

At 350, the OTT media service and product integration manager receives a list of retailer identifiers and prices offered by retailers associated with the retailer identifiers from the cloud product locator service 113.

At 360, the OTT media service and product integration manager presents the list within the media streaming application 143 for selection by the given user during streaming of the given media selection.

In an embodiment, at 370, the OTT media service and product integration manager receives a selected retailer identifier from the media streaming application 143 that was selected by the given user.

In an embodiment of 370 and at 371, the OTT media service and product integration manager obtains an API 124 associated with the selected retailer identifier.

In an embodiment of 371 and at 372, the OTT media service and product integration manager processes the API 124 with a transaction system 133 associated with the selected retailer identifier to purchase the selected product on behalf of the given user.

In an embodiment of 372 and at 373, the OTT media service and product integration manager obtains delivery and payment details from the given user through the media streaming application 143 and provides the delivery and payment details to the transaction system 133 using the API 124.

In an embodiment of 372 and at 374, the OTT media service and product integration manager obtains delivery and payment details from a subscriber account associated with the given user and provides the delivery and payment details to the transaction system 133 using the API 124.

In an embodiment of 373 and at 374, the OTT media service and product integration manager obtains the delivery and payment details from the subscriber account based on a buy-it-now option selected by the given user and corresponding to the selected retailer identifier from the list presented in the media streaming application 143.

In an embodiment of 372 and at 376, the OTT media service and product integration manager provides contact data for the given user to the transaction system 133 using the API 124 for the transaction system 133 to provide a receipt for a transaction completed for purchasing the selected product to the given user. The OTT media service and product integration manager also provides the select retailer identifier, the corresponding price for the selected product, and a media selection identifier for the given media selection to the cloud product locator service 113 along with an indication that the transaction for the selected product was completed and instructs the cloud product locator service 113 to retain the data provided as audit data.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
providing a processing environment for a user to view content during an interactive session with the user;
receiving, during the interactive session within the processing environment, a product identifier for a product from a media streaming service selected by the user during streaming of media selection on a user device;
identifying, during the interactive session within the processing environment, retailers that offer the product based on the product identifier, wherein identifying further includes mapping the product identifier to the retailers from available retailers, wherein mapping further includes identifying an Application Programming Interface (API) for each of the retailers;

obtaining, during the interactive session within the processing environment, a price for the product from each of the retailers, wherein obtaining further includes processing each API with a transaction system associated with each retailer using the product identifier and obtaining a corresponding availability of and the corresponding price of the product from the corresponding transaction system;

generating, during the interactive session within the processing environment, a list that comprises retailer identifiers for the retailers and the corresponding prices for the retailers; and providing, during the interactive session within the processing environment, the list back to the media streaming service for presentation to the user during streaming of the media selection on the user device.

2. The method of claim 1 further comprising, receiving, during the interactive session within the processing environment, a specific retailer identifier for a select retailer that the user purchased the product from and a media selection identifier for the media selection from the media streaming service and storing the specific retailer identifier, the media selection identifier, and a media streaming service identifier for the media streaming service as audit data.

3. The method of claim 2 further comprising, generating metrics from the audit data and other audit data, generating reports from the metrics, and selectively providing the reports to the retailers and the media streaming service.

4. The method of claim 1, wherein receiving further includes obtaining a media selection identifier for the media selection, a user device identifier for the user device, and a media streaming service identifier for the media streaming service and storing as audit data associated with the media streaming service.

5. The method of claim 1, wherein generating further includes sorting the list based on a first criteria associated with the prices.

6. The method of claim 5, wherein sorting further includes sorting the list based on a second criteria associated with physical distances between the user device and stores of the retailers.

7. The method of claim 1, wherein providing the list further includes providing an Application Programming Interface (API) identifier for each retailer identifier in the list.

8. A method, comprising:
indexing media selections with product identifiers for products;
providing a processing environment for users to view content during an interactive session with the users;
presenting, during the interactive sessions within the processing environment, the product identifiers during streaming of the media selections to user devices of the users;
receiving, during a given interactive sessions within the processing environment, a selected product identifier during a scene of a given media selection streaming to a given user device and selected by a given user from a media streaming application;
providing, during the given interactive sessions within the processing environment, the product identifier to a cloud product locator service;
receiving, during the given interactive sessions within the processing environment, a list of retailer identifiers and prices offered by retailers associated with the retailer identifiers from the cloud product locator service;
presenting, during the given interactive session within the processing environment, the list within the media streaming application for selection by the given user during streaming of the given media selection;
mapping, during the given interactive session within the processing environment, the product identifier to the retailers of the list, wherein mapping further includes identifying an Application Programming Interface (API) for each of the retailers; and
processing, during the given interactive session within the processing environment, the API and interacting with a transaction system associated with the selected retailer identifier to purchase a selected product associated with the selected product identifier on behalf of the given user.

9. The method of claim 8 further comprising, receiving, during the given interactive session within the processing environment, a selected retailer identifier from the media streaming application that was selected by the given user.

10. The method of claim 8, wherein processing further includes obtaining delivery and payment details from the given user through the media streaming application and providing the delivery and payment details to the transaction system using the API.

11. The method of claim 8, wherein processing further includes obtaining delivery and payment details from a subscriber account associated with the given user and providing the delivery and payment details to the transaction system using the API.

12. The method of claim 11, wherein obtaining the delivery and payment details further includes obtaining the delivery and payment details from the subscriber account based on a buy-it-now option selected by the given user and corresponding to the selected retailer identifier from the list presented in the media streaming application.

13. The method of claim 8, wherein processing further includes:
providing contact data for the given user to the transaction system using the API for the transaction system to provide a receipt for a transaction completed for purchasing the selected product; and
providing the select retailer identifier, the corresponding price for the selected product, a user device identifier for the user device, and a media selection identifier for the given media selection to the cloud product locator service along with an indication that the transaction for the selected product was completed and instructing the cloud product locator service to retain as audit data.

14. A system, comprising:
a cloud processing environment comprising at least one processor and a non-transitory computer-readable storage medium;
the non-transitory computer-readable storage medium comprising executable instructions; and
the executable instructions when provided to and executed by the at least one processor from the non-transitory computer-readable storage medium cause the at least one processor to perform operations comprising:
providing a processing environment within the cloud processing environment for a user to view content during an interactive session with the user;

receiving, during the interactive session within the processing environment, a product identifier for a product, a media selection identifier for a media selection, and a media streaming service identifier from a media streaming service that streams the media selection with the product identifier to a user device of a user;

identifying, during the interactive session within the processing environment, select retailers from available retailers that offer the product based on the product identifier;

sorting, during the interactive session within the processing environment, a list of select retailer identifiers for the select retailers along with prices offered for the product by the select retailers and producing a sorted list;

providing, during the interactive session within the processing environment, the sorted list back to the media streaming service for presentation to the user on the user device during streaming of media selection;

mapping, during the interactive session within the processing environment, the product identifier to the select retailers of the list, wherein mapping further includes identifying an Application Programming Interface (API) for each of the retailers;

processing, during the interactive session within the processing environment, the API and interacting with a transaction system associated with a given selected retailer identifier to purchase the product on behalf of the user;

storing, during the interactive session within the processing environment, audit data as a current date, a current time of day, the product identifier, the media selection identifier, and the media streaming service identifier; and modifying, during the interactive session within the processing environment, the audit data by adding a specific retailer identifier associated a specific retailer where the product was purchased by the user through the media streaming service, a specific price offered by the specific retailer, the media streaming service identifier, the media selection identifier, a sales date, and a sales time of day.

15. The system of claim 14, wherein the executable instructions when provided to and executed by the at least one processor from the non-transitory computer-readable storage medium further cause the at least one processor to perform operations comprising:

generating, during the interactive session and during other interactive sessions with other users within the processing environment, metrics from the audit data and other audit data collected for other media selections streamed to the user device and other user devices by the media streaming service and other media streaming services;

producing reports from the metrics; and sending selective reports to media streaming service, the other media streaming services, the select retailers, and the available retailers.

* * * * *